Patented Oct. 21, 1947

2,429,329

UNITED STATES PATENT OFFICE 2,429,329

THERMOSETTING PLASTIC FROM REDWOOD PULP AND FURFURYL ALCOHOL-FORMALDEHYDE RESIN

Edward Reineck and Isaac R. Dunlap, Appleton, Wis., assignors to The Institute of Paper Chemistry, Appleton, Wis., a corporation No Drawing. Application March 20, 1944, Serial No. 527,336

3 Claims. (Cl. 260—17.4)

Our invention relates to the production of articles of molded plastic materials and includes among its objects and advantages an improved composition of matter for the production of such articles from redwood heartwood. According to the embodiment of the invention selected for illustration herein, we first comminute the wood into small particles and then subject these particles in the absence of air to the action of steam at a pressure of about 600 p. s. i. for about thirty seconds, after which the sudden release of the pressure results in explosive disintegration of the particles. The resultant mass, usually containing about 50 per cent water, is then dried as, for instance, by a current of heated air to remove substantially all volatile matters present, leaving in the mass all the non-volatile ingredients of the original wood.

Such wood before treatment contains, roughly, 18 per cent of material soluble in alcohol. And it contains from 6 to 10 per cent of materials soluble in either alcohol or water. The remaining 82 per cent is about half cellulose, one-quarter lignin, and the other quarter non-cellulosic carbohydrates and minor ingredients of varying and more or less unknown composition.

We are unable to state definitely what happens during the steam disintegration, but after the disintegration the mass contains up to 30 to 35 per cent of materials soluble in alcohol and up to 15 or 20 per cent of materials soluble in either alcohol or water. All those materials are retained and utilized in the finished product.

Plastic articles of good quality can be produced from the product resulting from the steps above outlined. However, that product is not entirely thermosetting, and after such an article is formed between dies at about 300° F., and a pressure of the order and magnitude of 2,000 p. s. i., it is necessary to cool the dies to 250° F. before the finished product can be discharged without injury to the article. The heat loss involved in cooling and reheating the dies is a minor loss, but the time delay and labor cost is a major loss.

According to the invention we combined the disintegrated wood with a resin prepared as follows:

Example A—Resin

| | Pounds |
|---|---|
| Furfuryl alcohol | 750 |
| Formaldehyde | 168 |
| Water | 282 |
| 50% phosphoric acid | 5 |

With materially smaller batches, a slightly greater proportion of phosphoric acid is required to secure the desired speed of reaction.

The formaldehyde is in solution in the water and all the ingredients are placed in a steam-jacketed kettle and warmed to 100° C., so that any water of polymerization will be eliminated in the form of steam. At the beginning of the reaction the specific gravity of the mixture was read as 1.054 at 90° C. And, at the end of the reaction, the specific gravity is from 1.165 to 1.18 at 102° C. The specific gravity measurements were made with a hydrometer calibrated at 60° F. With a batch of about 80 pounds such a cook takes from one and one-half to about three hours, usually somewhat nearer the smaller figure. At the end of the reaction, the mixture usually gives a pH of about 2.3 when thoroughly agitated with an equal volume of water. Basic material such as alkali or triethanolamine is now added to reduce the acidity and increase the stability. The pH may be increased all the way to 7.0 but normally, satisfactory stability can be secured by utilizing the resin at about 4.4 to 5.0.

One specific example of a suitable plastic mix employing such a resin is as follows:

Example B—Molding mixture

| | Parts |
|---|---|
| Redwood pulp, prepared as above disclosed | 80 |
| Resin, according to Example A | 20 |
| Boric acid | 2 |
| Paraformaldehyde | 2 |
| Mold lubricant | 1 to 2 |
| Pigment, such as carbon black | 1 |

Such a mixture is stable over a long period of time. Depending on service conditions, the resin may be varied from about 15% to about 40% of the total mass. The boric acid may be varied from about 0.5% to about 10% of the amount of the resin. The paraformaldehyde may be varied from 0 to 10% of the amount of the resin. The mold lubricant may be a conventional metallic soap, or a lignin stearate.

In compounding the mixture, the wood pulp is mixed with the resin and other ingredients at about room temperature or below, and then milled on steam-heated rolls, during which milling the temperature of the mixture rises and a partial polymerization occurs. The maximum temperature should not exceed 300° F. The time of milling depends upon the temperature of the rolls. Common working temperatures of the rolls are 225°, 250° and 275° F., and the processing time varies from about 10 seconds to about 120 seconds; the higher the temperature, the shorter the time. The shorter milling time with higher temperatures will give a product having slightly better hardness and freedom from risk of distortion when removing the product from the hot molds. Such a product comes off the rolls in sheets, which may advantageously be from 0.04" thickness, which sheets are cooled, broken up and pulverized.

Such a product is an effectively thermo-setting molding powder which may be molded advantageously at temperatures between 290° and 340° F. and at pressures between 500 and 4,000 p. s. i. This product has had commercial acceptance in various finished articles, for instance, in the manufacture of bottle-caps on either Lauderbach or bed-frame presses.

Without further elaboration, the foregoing will so fully explain the invention that others may readily adapt the same for use under various conditions of service.

We claim:

1. A molding powder stable when stored for long periods of time and substantially completely thermo-setting comprising the following ingredients approximately in the proportions stated: 80 parts of steam-disintegrated redwood pulp still retaining substantially all the non-volatile ingredients of the original redwood; 20 parts of furfuryl alcohol-formaldehyde resin; two parts boric acid; two parts lignin stearate mold lubricant; two parts paraformaldehyde, and one part carbon black; said powder being in partially polymerized condition.

2. A molding powder stable when stored for long periods of time and substantially completely thermo-setting containing about 80 parts of steam-disintegrated redwood pulp still retaining substantially all the non-volatile ingredients of the original redwood; 20 parts of furfuryl alcohol-formaldehyde resin and two parts boric acid; said powder being in incompletely polymerized condition.

3. A thermo-setting molding powder stable when stored for long periods of time and substantially completely thermo-setting containing a major fraction of steam-disintegrated redwood pulp still retaining the non-volatile ingredients of the original redwood; from 15% to 40% of furfuryl alcohol-formaldehyde resin; boric acid from 0.5% to 10% of the resin; and a mold lubricant; said powder being in partially polymerized condition.

EDWARD REINECK.
ISAAC R. DUNLAP.

REFERENCES CITED

The following references are of record in the file of this patent:

UNITED STATES PATENTS

| Number | Name | Date |
|---|---|---|
| 1,899,768 | Nevin | Feb. 28, 1933 |
| 2,033,411 | Carson | Mar. 10, 1936 |
| 2,080,078 | Mason | May 11, 1937 |
| 2,192,129 | Ellis | Feb. 27, 1940 |
| 2,306,924 | Zerweck | Dec. 29, 1942 |
| 2,310,010 | Burrell | Feb. 2, 1943 |
| 2,343,972 | Harvey | Mar. 14, 1944 |
| 2,343,973 | Harvey | Mar. 14, 1944 |
| 2,367,312 | Reineck | Jan. 16, 1945 |
| 2,380,214 | Burrell | July 10, 1945 |